United States Patent Office 3,567,332
Patented Mar. 2, 1971

3,567,332
HELICOPTER ROTORS AND THE LIKE
Austin Richard Seed, Farnborough, England, assignor to Minister of Technology in Her Britannic Majesty's Government of the United Kingdom of Great Britain and Northern Ireland, London, England
Filed Oct. 2, 1968, Ser. No. 764,514
Claims priority, application Great Britain, Oct. 4, 1967, 45,110/67
Int. Cl. B64c 15/10
U.S. Cl. 416—90                              9 Claims

ABSTRACT OF THE DISCLOSURE

Air is discharged from two adjacent slots extending along the span of a helicopter rotor blade. The air is controlled cyclically by throttle valves disposed circumferentially about the rotor axis so that lift on the blade may be varied in accordance with its rotation, no incidence change being involved. Under certain flight conditions when the air demand is small (e.g. in hovering flight), the air flow to one of the slots is blanked off, the throttle valves being suitably profiled to effect this while still regulating flow to the other slot. Preferably the slots are of differing widths and the wider one is that which is blanked off. Three or more slots may be used if desired by suitable arrangements of air passages and valve profiles.

---

Figure 1:
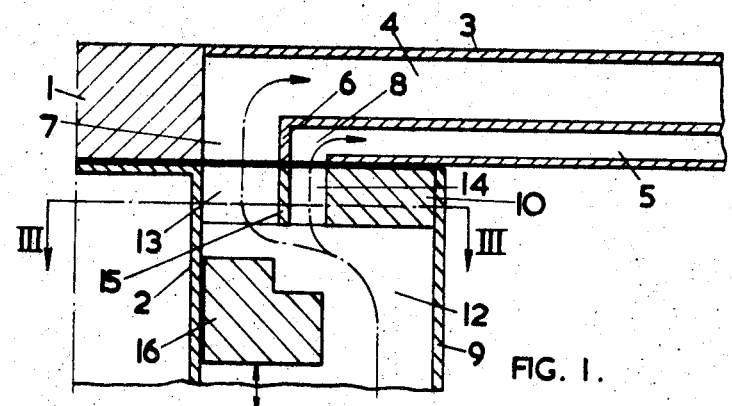

This invention relates primarily to helicopter rotors and more specifically to means for controlling aerodynamic lift on the rotor blades but may also find application in propellers and other forms of rotor.

Prior co-pending U.S. application Ser. No. 728,476 relates to helicopter rotors with variable incidence blades having spanwise-extending apertures from which air may be discharged to modify aerodynamic flow round the blades. The circulation control thus obtained is utilised to vary the lift on the blades.

Circulation control enables the use of elliptical blade sections which have relatively low profile drag, while the high lift coefficients obtainable enable a compact rotor design, both features helping to make higher forward speeds possible.

In the disclosure of the said prior application, lift is controlled both collectively over the rotor disc and cyclically in accordance with rotation of the rotor. In operation the rotor blades are adjusted to an optimum incidence appropriate to a desired flight condition and cyclic and control lift variations applied by varying the momenta of the fluid streams discharged from the apertures in the blades.

In this way, a helicopter need have neither flapping nor drag hinges; a feathering hinge is still necessary but, not being used in cyclic control of rotor lift, is not subjected to heavy wear. A relatively simple hub construction is thus a practicable proposition.

Since all control moments on the rotor are generated by circulation control, an adequate lift range must be available by this means to enable a helicopter to be trimmed or to manoeuvre at all speeds. Out of balance moments are small at low forward speeds and the required air momentum will also be small; at high forward speeds, the out of balance moment is large and the air momentum required for trimming is likewise large.

Added to this there will be an optimum pressure ratio across a discharge aperture above and below which greater power will be required for compressing the air used for control purposes; the power required to supply the air must also be considered.

Thus it is desirable to be able to vary the discharge area of an aperture for reasons of economy and efficiency at least; a ratio of approximately ¼ between the areas required for hovering and high speed flight is a fairly typical range.

Whilst it would be possible to physically vary the width of an aperture, mechanism for this purpose would necessarily have to be accommodated at least partly in the blade so detracting from the concept of simplicity.

As disclosed by the aforementioned prior application and others mentioned in the specification thereof, cyclic variations in circulation control air supply are effected by an annular valve assembly arranged around the non-rotating part of a rotor assembly and comprising a series of throttles through which the air passes before entering the rotor blades for discharge therefrom. Each throttle relates to a specific azimuth position of a blade and the air momentum required at that position may thus be appropriately regulated.

An extension of such as arrangement is utilised in the present invention in means for varying the effective area of air discharge without the need for moving parts within a rotor blade.

Broadly the invention consists in dividing the fluid flowing to an aperture or apertures in a particular spanwise section of a blade, discharging the divided stream from separate divisions of an aperture or separate apertures and interrupting a part of the divided stream.

One form of rotor assembly according to the invention has at least one blade carried by a rotatable head member which is mounted on non-rotating structure, at least one aperture extending along the span of a blade and arranged to discharge a fluid stream over the blade surface so as to induce lift on the blade, means for leading fluid flow into the head member and for conducting fluid thence to the blade for discharge therefrom, non-rotating control means for varying the momentum of the fluid stream and means for varying the effective discharge area of a blade aperture comprising at least one spanwise-extending divider in the aperture and means for interrupting fluid flow to one division of the aperture.

Preferably the divisions of the aperture are of differing widths.

Another form of rotor assembly according to the invention has at least one blade carried by a rotatable head member which is mounted on non-rotating structure as before but with at least two apertures extending along the span of a blade spaced from each other chordwise relative to the blade and arranged to discharge fluid streams over the blade surface in substantially the same direction so as to induce lift on the blade, means for leading fluid flow into the head member and for conducting fluid thence to the blade for discharge therefrom, non-rotating control means for varying the momentum of the fluid flow and means for interrupting fluid flow to one of the apertures.

By a feature of the invention the means for interrupting fluid flow comprises a flow divider feeding separate channels serving to conduit fluid to a blade and a throttle valve capable of closing one of the channels.

Figure 2:
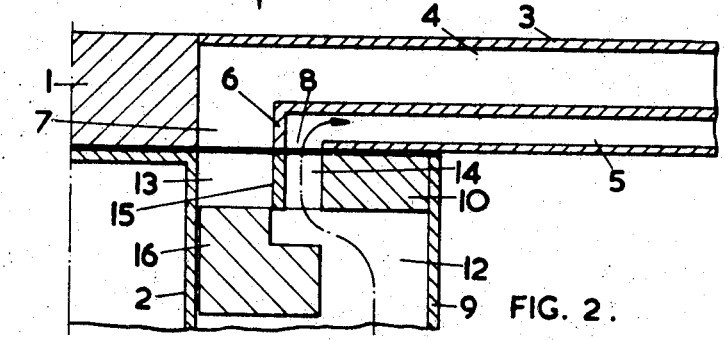
Figure 3:
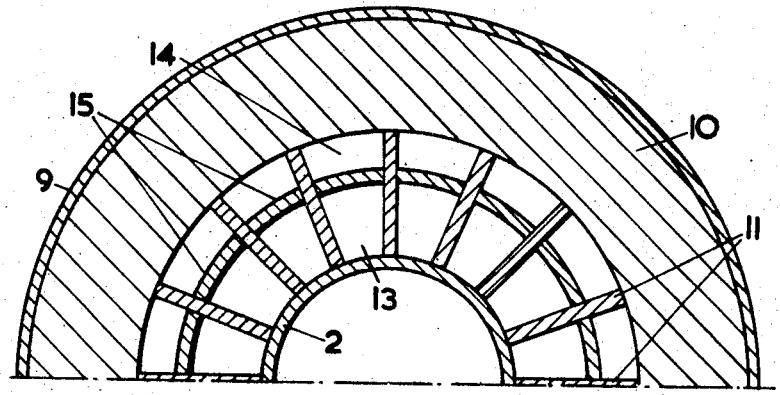
Figure 4:
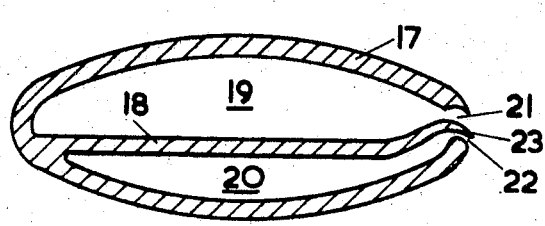

An embodiment of the invention will now be described with reference to the accompanying diagrammatic drawings, of which:

FIGS. 1 and 2 are axial sections through part of the hub and blade root assembly of a helicopter rotor during different control phases, FIG. 3 is a transverse half-section through the rotor hub taken on the line III—III in FIG. 1, and FIG. 4 is an axial section through a rotor blade.

In FIGS. 1 and 2, a rotor head 1 is shown mounted for rotation on a pillar member 2 intended to be attached to the structure of an aircraft. The rotor head carries a number of blades of which the root section 3 of one is shown. Each blade root is divided internally to form two ducts 4, 5 which extend spanwise into the blade proper (not shown). At one end the ducts open into a transfer port formed in the undersurface of the blade root adjacent to the rotor head. The transfer port is divided by a baffle 6 so that the ducts are connected to separate sections 7, 8 of the transfer port.

Surrounding the pillar member 2 is an annular valve assembly disposed coaxially with the rotor axis and defined by an outer wall 9. A ring member 10 attached to the inner face of the wall 9 partialy closes the gap between the wall and the pillar member as may also be seen from FIG. 3, to which reference is now made. The said gap is divided into segments by a series of circumferentially-spaced radial partitions 11 which also extend between the wall 9 and the pillar member thus forming a ring of segmental ports 12 (one such being shown in FIGS. 1 and 2) which are connected at their lower ends to a common air supply such as the compressor of a gas turbine engine. The outlet from each port is divided into two channels 13, 14 by circumferential splitter plates 15 extending between adjacent radial partitions 11 and of the same depth as the ring member 10.

The transfer ports in the blade roots are aligned with the outlets of the ports 12 and each transfer port has an entry of segmental shape (not shown) which rides progressively over the valve assembly during rotation of the rotor. The baffles 6 in the transfer ports, as may be seen from FIGS. 1 and 2, are aligned with the splitter plates 15 and consequently air flowing from the channels 13, 14 will pass to the separate sections 7, 8 of the transfer port and so to the ducts 4, 5 respectively.

In each of the segmental ports of the valve assembly is a slide valve 16 which is movable up or down in the port and has a stepped profile which can be likened to a letter L with thickened arms. In the position of the valve shown in FIG. 1, air will flow freely to the outlet channels 13, 14 while upward movement of the valve will throttle the total flow to both channels. Continued movement will result first in a restriction of the air flowing to the channel 13 and then in the vertical arm of the valve entering the said channel to block it off. Air can still pass to the channel 14 and will be throttled by further upward movement of the valve.

FIG. 4 show a typical section through one of the rotor blades which are elliptical, the chord being of the order of five times the depth (i.e., a 20 percent ellipse).

Each blade is hollow and comprises a shell 17 divided longitudinally by a partition 18 to form two passages 19, 20.

Spanwise-extending apertures 21, 22 are formed adjacently in the surface of each blade near its trailing edge, each slot being connected to a separate passage which are in turn connected to the ducts 4, 5 in the blade root. For all practical purposes the apertures comprise a single slot with a divider 23 formed by one end of the partition 18 running along its length. The aperture 21 is wider than the aperture 22 in the ratio of approximately 3/1.

Air supplied to the ports 12 will be directed by the splitter plates in the port outlets and the baffles in the blade root transfer ports to separate ducts in the blades to be discharged therefrom as thin layers tangentially of the rearward blade surfaces to modify the circulation around the blades.

Movement of the valve 16 will vary the amount of air flowing to the transfer ports (which receive air from the port outlets according to the relative positions of the blades) and hence the momenta of the streams. The apertures 21, 22 effectively operate as one during such times as the upper arm of the valve is well clear of the channel 13. Flow to this channel and the aperture 21 will however be restricted as the valve approaches the channel until it is eventually blanked off and air can only flow through the narrower aperture 22.

Thus the aperture discharge area can be matched to the amount of air flowing to the blades to maintain the pressure ratio of discharge within suitable limits as dictated by flight conditions.

Although two adjacent apertures are shown in the embodiment, it is possible to include more than this. Theoretically, the greater the number of apertures, the better the match that can be achieved between the discharge area and flow conditions; however a large number of apertures might present practical difficulties and it is thought that no great advantage will be obtained by having more than three. The apertures need not be immediately adjacent but can be separated in a chordwise sense though they should be in the same surface of a blade and discharge air in substantially the same direction over that surface.

Preferably the valves 16 would be linked to a control system giving a variation in valve opening circumferentially around the valve assembly, such as a gimbal ring as disclosed in the aforementioned prior specification. The relative momenta of the streams discharge from the blade apertures may thus be varied in appropriately-phased relationship to the rotation of the rotor, any desirable blanking off of air supply to the wider aperture being effected automatically.

The overall effect would be equivalent to the cyclic blade incident changes (cyclic pitch control) in a conventional helicopter. The phase relationship between blade lift and rotor control could also be varied to effect roll and pitch control by varying the plane of inclination of the gimbal ring.

The arrangement last mentioned may be used in conjunction with that disclosed in the specification of British Patent No. 1,066,223 wherein the slide valves may be adjusted independently of movement of the gimbal ring by varying the effective lengths of push rods used to connect them to the latter. This can be used to apply a second harmonic variation in lift to trim out of balance rolling moments by redistributing lift over the rotor disc which could lead to a further reduction in control air power requirements.

The total airflow passing to the blades might be varied in the same sense to increase or decrease the total blade lift in similar fashion to conventional helicopter collective pitch control by varying the air supply to the control valves as by a sleeve valve arrangement generally in accordance with prior application Ser. No. 728,476 or by superimposing a simultaneous movement in one direction on the valve positions.

Again, the blades might be provided with spring flaps which serve to close one or both of the apertures when not in use, the flaps being operated by the pressure of the control air either directly or through an intermediate arrangement such as an air sac. Other modifications which can be applied include the use of apertures in the leading edge of the blade to reverse the direction of lift on a retreating blade in the reverse flow region of the rotor disc, and dividing the blade apertures into spanwise sections each with its own control air supply.

I claim:

1. A rotor assembly having at least one blade carried by a rotatable head member mounted on non-rotating structure, means for inducing lift on the blade by fluid discharge from the blade along the span thereof comprising two apertures formed in a particular spanwise section of the blade and arranged to discharge fluid streams substantially tangentially to the adjacent blade surface in a substantially common direction, means for leading fluid flow into the head member and for conducting fluid thence to the blade apertures for discharge therefrom, means for varying the momentum of the fluid flow, and means for maintaining the pressure ratio of fluid discharge from the apertures within predetermined limits in accordance with variations in flow momentum comprising means for dividing fluid flow between the apertures and means for interrupting flow to one aperture.

2. A rotor assembly according to claim 1 in which the means for varying the momentum of fluid flow and the means for interrupting flow to one aperture are combined.

3. A rotor assembly according to claim 1 in which the apertures are of differing discharge area.

4. A rotor assembly according to claim 3 in which the flow interrupting means interrupts flow to the aperture having the larger discharge area.

5. A rotor assembly according to claim 1 in which the apertures are spaced from each other chordwise relative to the blade.

6. A rotor assembly according to claim 1 including a flow divider feeding separate channels serving to conduct fluid to a blade, and a throttle valve capable of closing at least one of the channels.

7. A rotor assembly according to claim 1 including an annular valve assembly disposed co-axially about the rotor axis and having fluid outlet ports communicating with passages connected to the blade apertures, each port being divided into at least two channels, and a throttle valve associated with each port and having at least one portion arranged to enter a channel at predetermined valve positions so as to close off the said channel.

8. A rotor assembly according to claim 7 in which the throttle valve is a slide valve having at least one stepped portion shaped and arranged to enter and close off a channel.

9. A rotor assembly according to claim 7 having two or more blades, each blade being provided with two aperture divisions in its surface, and passages within the blades connecting the divisions with separate channels in each fluid outlet port in accordance with rotation of the rotor.

References Cited

UNITED STATES PATENTS

| | | | |
|---|---|---|---|
| 2,925,129 | 2/1960 | Yuan et al. | 170—135.4 |
| 3,062,483 | 11/1962 | Davidson et al. | 170—135.4UX |
| 3,288,225 | 11/1966 | Flint et al. | 170—135.4 |
| 3,367,581 | 2/1968 | Kizilos et al. | 170—135.4UX |

FOREIGN PATENTS

| | | | |
|---|---|---|---|
| 954,413 | 6/1949 | France | 170—135.4 |
| 1,118,612 | 11/1961 | Germany | 170—135.4 |
| 1,198,145 | 8/1965 | Germany | 170—135.4 |

EVERETTE A. POWELL, Jr., Primary Examiner